US011855529B2

(12) United States Patent
Mantooth et al.

(10) Patent No.: US 11,855,529 B2
(45) Date of Patent: Dec. 26, 2023

(54) PWM-CONTROLLED THREE LEVEL STACKED STRUCTURE LLC RESONANT CONVERTER AND METHOD OF CONTROLLING SAME

(71) Applicant: BOARD OF TRUSTEES OF THE UNIVERSITY OF ARKANSAS, Little Rock, AR (US)

(72) Inventors: Homer Alan Mantooth, Fayetteville, AR (US); Yuqi Wei, Fayetteville, AR (US)

(73) Assignee: BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 101 days.

(21) Appl. No.: 17/472,828

(22) Filed: Sep. 13, 2021

(65) Prior Publication Data

US 2022/0085728 A1 Mar. 17, 2022

Related U.S. Application Data

(60) Provisional application No. 63/076,995, filed on Sep. 11, 2020.

(51) Int. Cl.
*H02M 3/00* (2006.01)
*H02M 1/00* (2006.01)
*H02M 3/335* (2006.01)

(52) U.S. Cl.
CPC ........... *H02M 3/01* (2021.05); *H02M 1/0058* (2021.05); *H02M 3/33553* (2013.01); *H02M 3/33571* (2021.05)

(58) Field of Classification Search
CPC ... H02M 3/3353; H02M 3/01; H02M 3/33571
See application file for complete search history.

(56) References Cited

U.S. PATENT DOCUMENTS 5,684,678 A 11/1997 Barrett
6,344,979 B1 2/2002 Huang et al.
(Continued)

FOREIGN PATENT DOCUMENTS

WO 2019144241 A1 8/2019

OTHER PUBLICATIONS

W. Liu, B. Wang, W. Yao, Z. Lu and X. Xu, "Steady-state analysis of the phase shift modulated LLC resonant converter," 2016 IEEE Energy Conversion Congress and Exposition (ECCE), Milwaukee, WI, 2016, pp. 1-5.

(Continued)

*Primary Examiner* — Kyle J Moody
(74) *Attorney, Agent, or Firm* — Locke Lord LLP; Tim Tingkang Xia, Esq.

(57) ABSTRACT

The invention discloses a novel control scheme/strategy for the stacked structure LLC resonant converter. The control scheme includes a control signal as a gating signal of the fourth switch, and gating signals of the first, second and third switches that are operably generated according to the gating signal of the fourth switch. The gating signals of the second switch has a same duty ratio as and a phase shift of 180 degrees from the gating signal of the fourth switch. The gate signals of the first and third switches are complementary with the gate signals of the second and fourth switches, respectively. By adopting the control strategy, a three level LLC resonant network input voltage is generated, which includes Vin, Vin/2 and 0.

15 Claims, 13 Drawing Sheets

(56) References Cited

U.S. PATENT DOCUMENTS

| | | | |
|---|---|---|---|
| 8,149,599 B2* | 4/2012 | Coccia | H02M 3/01 363/21.02 |
| 9,825,545 B2* | 11/2017 | Chen | H02M 3/335 |
| 10,804,812 B1* | 10/2020 | Dehem | H02M 3/33571 |
| 2014/0119060 A1 | 5/2014 | Zhu et al. | |
| 2014/0198536 A1 | 7/2014 | Fu et al. | |
| 2015/0349627 A1 | 12/2015 | Lin et al. | |
| 2016/0233776 A1* | 8/2016 | Nielsen | H02M 3/33546 |
| 2017/0063251 A1* | 3/2017 | Ye | H02M 3/33576 |
| 2018/0262117 A1* | 9/2018 | Lu | H02M 7/797 |
| 2020/0266719 A1* | 8/2020 | Oh | H02M 3/01 |
| 2021/0067045 A1* | 3/2021 | Zhang | H02M 3/33573 |
| 2021/0203236 A1* | 7/2021 | Zhang | H02M 3/33561 |
| 2022/0271646 A1* | 8/2022 | Lu | H02M 5/293 |

OTHER PUBLICATIONS

H. Wu, T. Mu, X. Gao and Y. Xing, "A Secondary-Side Phase Shift-Controlled LLC Resonant Converter With Reduced Conduction Loss at Normal Operation for Hold-Up Time Compensation Application," IEEE Trans. Power Electron., vol. 30, No. 10, pp. 5352-5357, Oct. 2015.

Y. Wei, Q. Luo, X. Du, N. Altin, A. Nasiri and J. M. Alonso, "A Dual Half-Bridge LLC Resonant Converter With Magnetic Control for Battery Charger Application," IEEE Trans. Power Electron., vol. 35, No. 2, pp. 2196-2207, Feb. 2020.

Y. Wei, Q. Luo, X. Du, N. Altin, J. M. Alonso and A. Mantooth, "Analysis and Design of the LLC Resonant Converter with Variable Inductor Control Based on Time Domain Analysis," IEEE Trans. Ind. Electron.

X. Sun, X. Li, Y. Shen, B. Wang and X. Guo, "Dual-Bridge LLC Resonant Converter With Fixed-Frequency PWM Control for Wide Input Applications," IEEE Trans. Power Electron., vol. 32, No. 1, pp. 69-80, Jan. 2017.

H. Wang and Z. Li, "A PWM LLC Type Resonant Converter Adapted to Wide Output Range in PEV Charging Applications," IEEE Trans. Power Electron., vol. 33, No. 5, pp. 3791-3801, May 2018.

* cited by examiner

PWM-CONTROLLED THREE LEVEL STACKED STRUCTURE LLC RESONANT CONVERTER AND METHOD OF CONTROLLING SAME

CROSS-REFERENCE TO RELATED PATENT APPLICATION

This application claims priority to and the benefit of U.S. Provisional Patent Application Ser. No. 63/076,995, filed Sep. 11, 2020, which is incorporated herein in its entirety by reference.

FIELD OF THE INVENTION

This invention relates generally to the power supply that requires DC-DC power conversion, and more particularly to a novel control strategy for stacked structure LLC resonant converter that can provide fixed switching frequency and wide input or output voltage range operation.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

The LLC resonant converter is one of the most popular isolated DC/DC converters, and it has been widely used in many different applications. For the LLC resonant converter, the most frequently adopted control strategy is pulse frequency modulation (PFM). However, when the PFM-controlled LLC resonant converter is adopted in wide input/output voltage range applications, for example, on-board battery chargers and solar energy applications, a wide operating switching frequency range is required to meet the wide voltage gain requirement. Wide switching frequency range causes the following problems: 1) complicate design and optimization of magnetic components and gate driver circuitry; 2) poor electro-magnetic interference (EMI) performance; and 3) limited controllable voltage gain range since the converter voltage gain is sensitive to the output power. Therefore, in order to reduce the switching frequency range or have fixed switching frequency operation, many different control strategies have been proposed.

One of the most straightforward ways to achieve the fixed frequency operation is by using phase shift modulation (PSM). For the primary side PSM (PSPSM), by controlling the phase shift angle between two switching legs, the resonant tank input voltage can be adjusted, and finally the output voltage is regulated. Although the PSM control can reduce the output voltage over a wide range, it is tricky to satisfy the zero-voltage switching (ZVS) operation for the lagging-leg switches. Then, the controllable output voltage range is restricted. In addition to the PSPSM, the secondary side PSM (SSPSM) is proposed, where the two bottom full-bridge rectifier diodes are replaced by MOSFETs. By controlling the secondary phase shift angle, the output voltage is regulated. Two additional gate drivers are required.

Resonant frequency modulation (RFM) is another approach to achieve fixed switching frequency operation. By modulating the resonant capacitor or resonant inductor, the resonant frequency can be modified, which ultimately adjusts the output voltage. The switch-controlled capacitor (SCC) is adopted in LLC resonant converters to achieve the modulation of the resonant capacitor. Although fixed switching frequency operation can be achieved, an additional switch and capacitor are required. In addition, in order to achieve the ZVS operation of the auxiliary switch, the resonant inductor current detection and synchronization are necessary, which increases the cost and complexity of the topology. The variable inductor control (VIC) can be adopted to regulate the resonant inductance. However, due to the magnetic material limitation, the controllable voltage gain range is limited, and additional control winding loss is generated.

Another straightforward way to achieve fixed frequency operation is pulse width modulation (PWM). For the primary side PWM (PSPWM), the output voltage is regulated by controlling the duty cycle of the additional bi-directional switch, which can modify the system structure from full-bridge to half-bridge. For the secondary side PWM (SSPWM), the output voltage is regulated by adjusting the duty cycle of the additional switch on the secondary side of the transformer, which can modify the secondary rectifier structure from a full-bridge rectifier to a voltage doubler rectifier. Although wide range operation is achieved, additional switches and corresponding gate drivers and control strategies are required.

The multi-level LLC resonant converter topology has been proposed and adopted for wide range application. Although narrow variation of switching frequency range can be achieved, compared with conventional full-bridge, half-bridge, or stacked structure LLC resonant converter, additional clamping diodes or switches are required, which increases the system cost and complexity. In addition, the PFM control strategy is adopted, so variable switching frequency range is still required, which makes the design of the magnetic components and gate driver circuitry challenging.

Therefore, a heretofore unaddressed need exists in the art to address the aforementioned deficiencies and inadequacies.

SUMMARY OF THE INVENTION

One of the objectives of this invention is to disclose an LLC resonant converter and a control strategy (scheme) of the LLC resonant converter so as to provide fixed switching frequency in a wide range application. The LLC resonant converter, among other things, has the following features: (1) narrow or fixed switching frequency operation, which simplifies the design and optimization of the magnetic components and gate driver circuitry, (2) no modification of the conventional LLC resonant converter topology so that the system is easy to implement with minimum cost, (3) a wide range of applications so that it can be applied to different industrial fields, (4) high reliability so that the converter can meet industrial standards, which requires a simple structure and fewer components, and (5) stability of the closed loop control to ensure the safe operation of the converter.

In one aspect, the invention relates to a stacked structure LLC resonant converter comprising a stacked structure inverter electrically coupled to a power supply for generating an output voltage; an LLC resonant tank electrically coupled to the stacked structure inverter; and a rectifier electrically coupled to the LLC resonant tank for providing a rectified DC voltage to an output load.

In one embodiment, the stacked structure inverter comprises a first input terminal and a second input terminal electrically coupled to the power supply for receiving an input voltage Vin therefrom; a first output terminal and a second output terminal for outputting the output voltage Vab; a first input capacitor and a second input capacitor electrically coupled between the first input terminal and the second input terminal, respectively, wherein the first input capacitor and the second input capacitor are electrically coupled to one another in series; and a first power switch, a second power switch, a third power switch and a fourth power switch electrically coupled to one another in series; wherein the first power switch is electrically coupled between the first input terminal and the first output terminal; the second power switch is electrically coupled between the first output terminal and a middle node between the first input capacitor and the second input capacitor; the third power switch is electrically coupled between the middle node and the second output terminal; and the fourth power switch is electrically coupled between the second input terminal and the second output terminal.

In one embodiment, each of the first and second, or third and fourth switches are a half-bridge unit.

In one embodiment, the LLC resonant tank comprises a transformer comprising a primary winding and a secondary winding; and an LLC resonant circuit electrically coupled between the first and second output terminals of the stacked structure inverter, and comprising a first inductor, a resonant capacitor and a second inductor electrically connected to one another in series, wherein the second inductor is part of the transformer.

In one embodiment, the second inductor is a magnetizing inductor.

In one embodiment, the rectifier is electrically coupled to the secondary winding of the transformer.

In one embodiment, the rectifier comprise a full-bridge rectifying circuit. Other rectifiers, like transformer center tapped rectifier structure and voltage rectifier structure can also be used.

In one embodiment, the rectifier further comprise a filtering capacitor for filtering the rectified DC voltage outputted to the output load.

In one embodiment, the stacked structure LLC resonant converter further comprises a pulse width modulation (PWM) control scheme for regulating the output voltage from the stacked structure inverter.

In one embodiment, the PWM control scheme comprises a control signal that is a gating signal of the fourth switch, and gating signals of the first, second and third switches that are operably generated according to the gating signal of the fourth switch.

In one embodiment, the gating signals of the second and fourth switches have a same duty ratio and a phase shift of 180 degrees.

In one embodiment, the gate signals of the first and third switches are complementary with the gate signals of the second and fourth switches, respectively.

In one embodiment, the output voltage from the stacked structure inverter is regulated to have three levels, Vin, Vin/2 and 0, wherein Vin is the input voltage from the power supply, thereby generating a three level LLC resonant input voltage for the LLC resonant tank.

In one embodiment, the output voltages are controllable with the duration of each voltage level of the control signal of the gating signal of the fourth switch.

In one embodiment, a voltage gain of the stacked structure LLC resonant converter has a monotonic relationship with a duty ratio of the control signal.

In one embodiment, the voltage gain is not sensitive to the output load.

In another aspect, the invention relates to a control method for the stacked structure LLC resonant converter as disclosed above. The control method comprises providing a control signal as a gating signal of the fourth switch; and generating gating signals of the first, second and third switches according to the control signal; and applying the control signal to the fourth switch and the generated gating signals to the first, second and third switches, respectively, so as to generate the output voltage. The generated gating signals of the second switch has a same duty ratio as and a phase shift of 180 degrees from the gating signal of the fourth switch; and wherein the generated gate signals of the first and third switches are complementary with the gate signals of the second and fourth switches, respectively.

In one embodiment, the inverter output voltage is regulated to have three levels, Vin, Vin/2 and 0, wherein Vin is the input voltage from the power supply, is a three level LLC resonant input voltage for the LLC resonant tank.

In one embodiment, the output voltages are controllable with the duration of each voltage level of the control signal.

In one embodiment, a voltage gain of the stacked structure LLC resonant converter has a monotonic relationship with a duty ratio of the control signal, and is not sensitive to the output load.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

FIG. 8A: abrupt change of input voltage. FIG. 8B: abrupt change of output power.

DETAILED DESCRIPTION OF THE INVENTION

Figure 1:
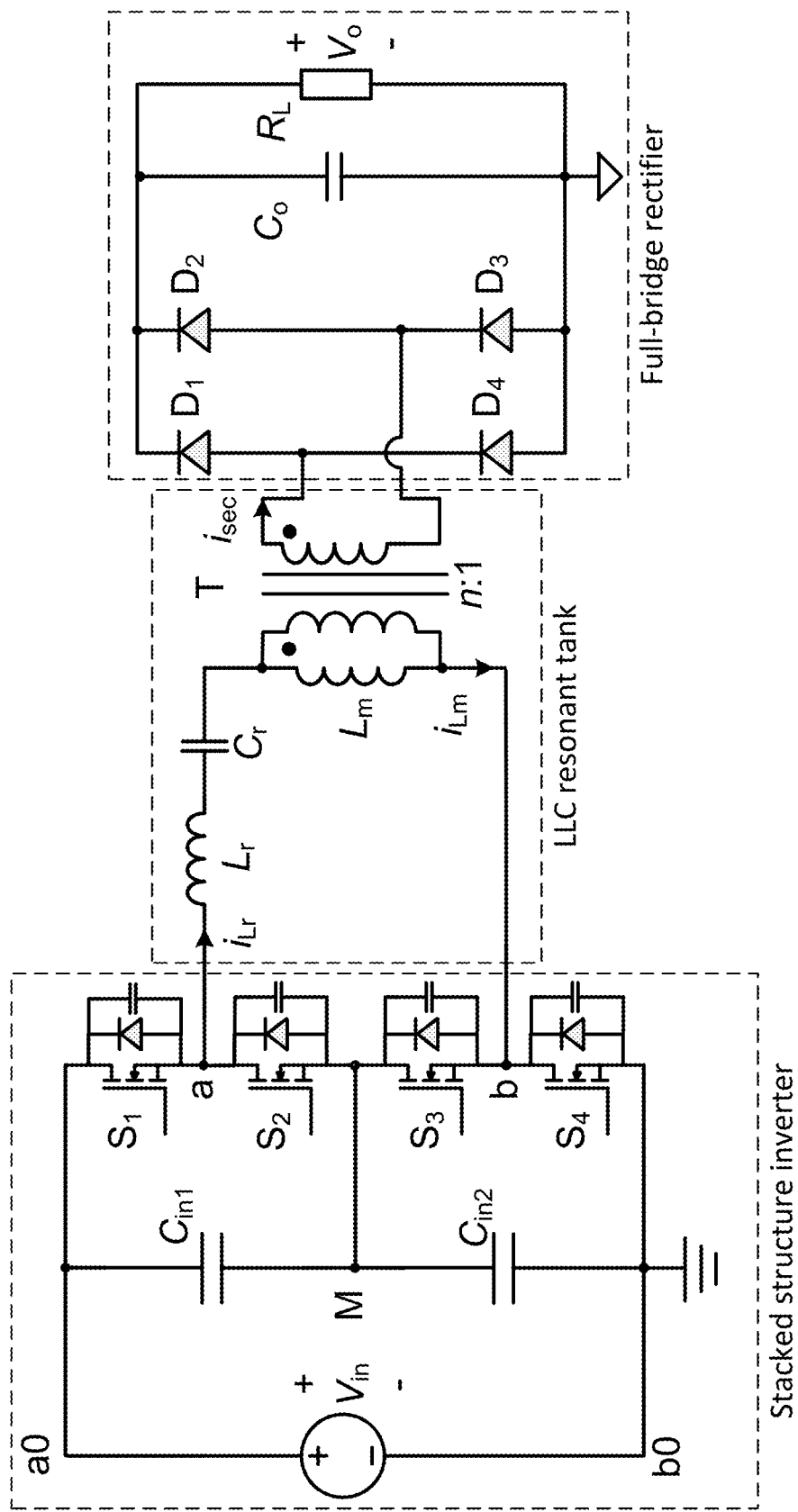
FIG. 1 shows schematically a stacked structure LLC resonant converter according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims.

Whenever a range is given in the specification, for example, a temperature range, a time range, or a composition or concentration range, all intermediate ranges and subranges, as well as all individual values included in the ranges given are intended to be included in the invention. It will be understood that any subranges or individual values in a range or subrange that are included in the description herein can be excluded from the claims herein.

It will be understood that, as used in the description herein and throughout the claims that follow, the meaning of "a", "an", and "the" includes plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising", or "includes" and/or "including", or "has" and/or "having", or "carry" and/or "carrying", or "contain" and/or "containing", or "involve" and/or "involving", "characterized by", and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used in the disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in the disclosure, the phrase "at least one of A, B, and C" should be construed to mean a logical (A or B or C), using a non-exclusive logical OR. As used herein, the term "and/or" includes any and all combinations of one or more of the associated listed items.

Embodiments of the invention are illustrated in detail hereinafter with reference to accompanying drawings. The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

One of the objectives of this invention is to disclose a stacked structure LLC resonant converter and a control strategy (scheme) of the LLC resonant converter so as to provide fixed switching frequency in a wide range application.

In one aspect of the invention, the stacked structure LLC resonant converter includes a stacked structure inverter electrically coupled to a power supply for generating an output voltage; an LLC resonant tank electrically coupled to the stacked structure inverter; and a rectifier electrically coupled to the LLC resonant tank for providing a rectified DC voltage to an output load, as shown in FIG. 1.

In one embodiment shown in FIG. 1, the stacked structure inverter comprises a first input terminal a0 and a second input terminal b0 electrically coupled to the power supply for receiving an input voltage Vin therefrom; a first output terminal a and a second output terminal b for outputting the output voltage Vab; a first input capacitor $C_{in1}$ and a second input capacitor $C_{in2}$ electrically coupled between the first input terminal a0 and the second input terminal b0, respectively. The first input capacitor $C_{in1}$ and the second input capacitor $C_{in2}$ are electrically coupled to one another in series.

The stacked structure inverter also comprises a first power switch $S_1$, a second power switch $S_2$, a third power switch $S_3$ and a fourth power switch $S_4$ electrically coupled to one another in series. The first power switch $S_1$ is electrically coupled between the first input terminal a0 and the first output terminal a. The second power switch $S_2$ is electrically coupled between the first output terminal a and a middle node M between the first input capacitor $C_{in1}$ and the second input capacitor $C_{in2}$. The third power switch $S_3$ is electrically coupled between the middle node M and the second output terminal b. The fourth power switch $S_4$ is electrically coupled between the second input terminal b0 and the second output terminal b.

In one embodiment, each of the first and second, or third and fourth switches $S_1$-$S_4$ are an half bridge unit.

In one embodiment, the LLC resonant tank comprises a transformer including a primary winding and a secondary winding; and an LLC resonant circuit electrically coupled between the first and second output terminals a and b of the stacked structure inverter. The LLC resonant circuit includes a resonant inductor $L_r$, a capacitor $C_r$ and a magnetizing inductor $L_m$ electrically connected to each other in series. The magnetizing inductor $L_m$ is a part of the transformer.

Figure 9:
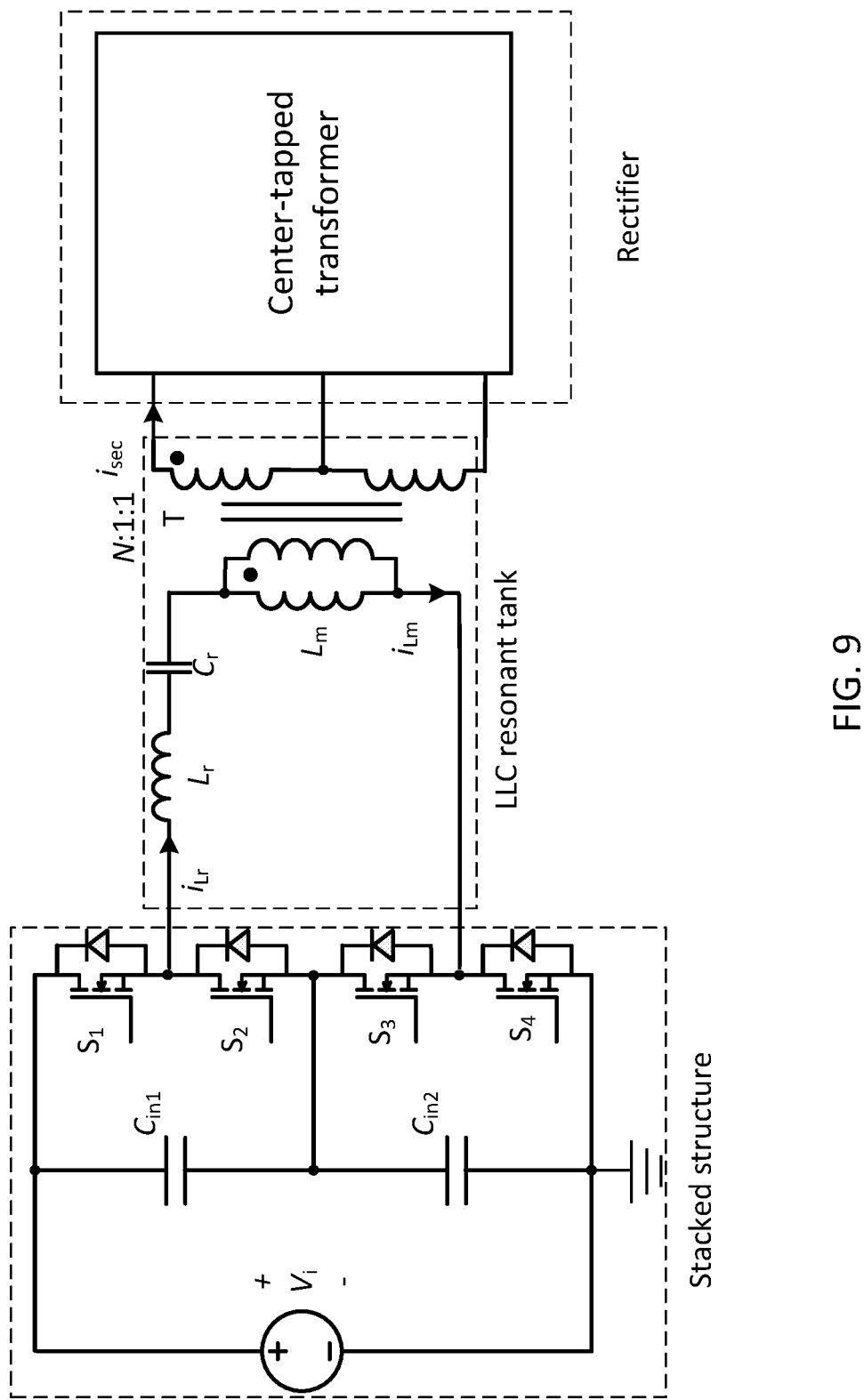
FIG. 9 shows schematically a stacked structure LLC resonant converter according to another embodiment of the invention.
Figure 10:
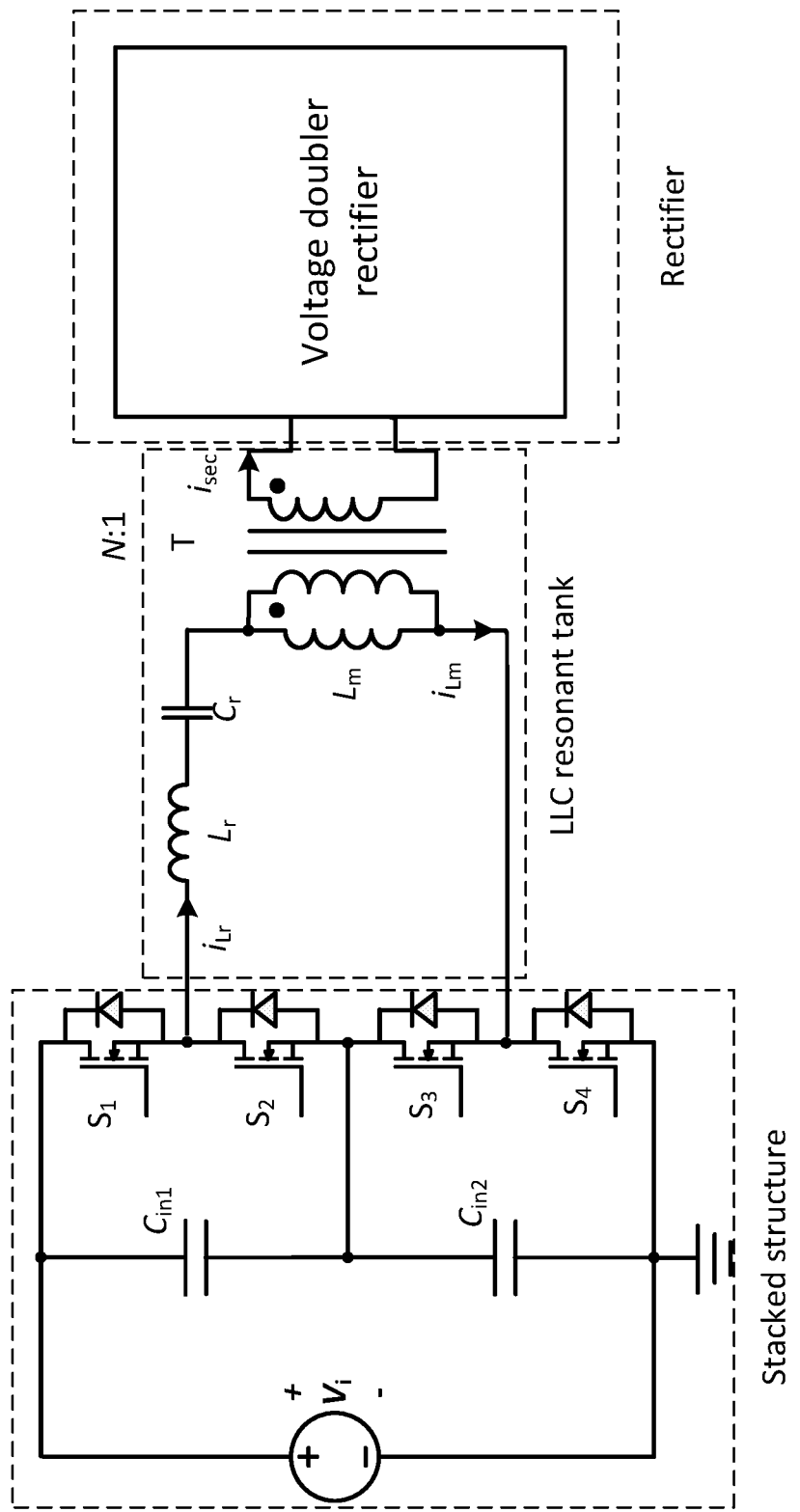
FIG. 10 shows schematically a stacked structure LLC resonant converter according to yet another embodiment of the invention.

In one embodiment, the rectifier is electrically coupled to the secondary winding of the transformer. In one embodiment, the rectifier includes a full-bridge rectifier. Other rectifier structures, like transformer center tapped rectifier and voltage doubler rectifier can also be applied, as shown in FIGS. 9-10. In one embodiment, the rectifier further comprise a filtering capacitor Co for filtering the rectified DC voltage outputted to the output load.

In one embodiment, the stacked structure LLC resonant converter further includes a pulse width modulation (PWM) control scheme for regulating the output voltage from the stacked structure inverter. In one embodiment, the PWM control scheme comprises a control signal that is a gating signal of the fourth switch $S_4$, and gating signals of the first, second and third switches $S_1$-$S_3$ that are operably generated according to the gating signal of the fourth switch $S_4$.

In one embodiment, the gating signals of the second and fourth switches $S_2$ and $S_4$ have a same duty ratio and a phase shift of 180 degrees. In one embodiment, the gate signals of the first and third switches $S_1$ and $S_3$ are complementary with the gate signals of the second and fourth switches $S_2$ and $S_4$, respectively.

In one embodiment, the output voltage from the stacked structure inverter is regulated to have three levels, Vin, Vin/2 and 0, wherein Vin is the input voltage from the power supply, thereby generating a three level LLC resonant input voltage for the LLC resonant tank.

In one embodiment, the output voltages are controllable with the duration of each voltage level of the control signal of the gating signal of the fourth switch $S_4$.

In one embodiment, a voltage gain of the stacked structure LLC resonant converter has a monotonic relationship with a duty ratio of the control signal.

In one embodiment, the voltage gain is not sensitive to the output load.

In another aspect, the invention relates to a control method for the stacked structure LLC resonant converter as disclosed above. The control method comprises providing a control signal as a gating signal of the fourth switch $S_4$; and generating gating signals of the first, second and third switches $S_1$-$S_3$ according to the control signal; and applying the control signal to the fourth switch $S_4$ and the generated gating signals to the first, second and third switches $S_1$-$S_3$, respectively, so as to generate the output voltage. The generated gating signals of the second switch $S_2$ has a same duty ratio as and a phase shift of 180 degrees from the gating signal of the fourth switch $S_4$. The generated gate signals of the first and third switches $S_1$ and $S_3$ are complementary with the gate signals of the second and fourth switches $S_2$ and $S_4$, respectively.

In one embodiment, the inverter output voltage is regulated to have three levels, Vin, Vin/2 and 0, where Vin is the input voltage from the power supply, is a three level LLC resonant input voltage for the LLC resonant tank.

In one embodiment, the output voltages are controllable with the duration of each voltage level of the control signal.

In one embodiment, a voltage gain of the stacked structure LLC resonant converter has a monotonic relationship with a duty ratio of the control signal, and is not sensitive to the output load.

Figure 2:
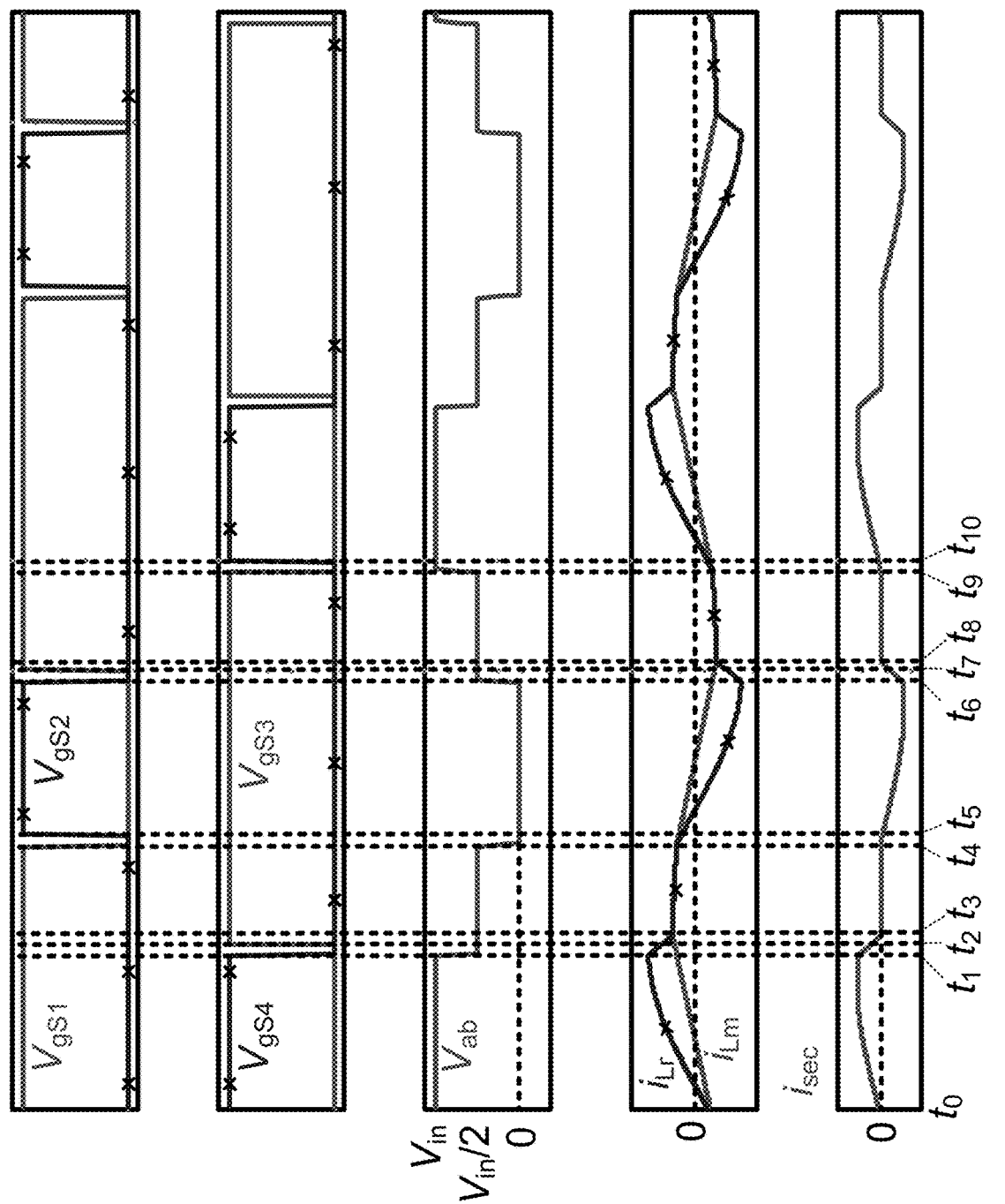
FIG. 2 shows operational waveforms of a PWM control strategy according to embodiments of the invention.

The control strategy/scheme for the stacked structure LLC resonant converter is shown in FIG. 2 according to one embodiment of the invention. The gating signal for switch S4, VgS4, is controlled by the system, and the other three gating signals are generated according to VgS4. Specifically, the gating signal for switch S2, VgS2, has the same duty ratio, but it has 180 degrees phase shift with respect to the gating signal for switch S4. The gating signals for switch S1 and switch S3 are complementary with the gating signals for switch S2 and switch S4, respectively. Each of switches S1-S4 is a half bridge switch. By adopting the control strategy, a three level LLC resonant network input voltage is generated, which includes Vin, Vin/2 and 0. Instead of adopting a frequency control strategy, a PWM control strategy is adopted to regulate the output by controlling the duration of each voltage level. This novel control strategy benefits the LLC resonant converter in many aspects. First, fixed switching operation can be achieved, which is beneficial to the design and optimization of magnetic components. Second, the relationship between the voltage gain and the control variable-duty ratio is monotonic, which simplifies the design of the controller and guarantees the stability of the system. Third, no modification to the conventional LLC resonant converter is required, which increases the reliability and reduces the cost of the system. Fourth, the voltage gain of the PWM-controlled three-level LLC resonant converter is not sensitive to the output load, which makes it suitable for a wide range of applications.

As shown in FIG. 1, the stacked structure LLC resonant converter according to one embodiment of the invention includes a stacked structure inverter; an LLC resonant tank; and a full-bridge rectifier. Instead of the traditional frequency control, a PWM control strategy/scheme is adopted to regulate the output voltage. The gating signals for the switches are shown in FIG. 2. For the PWM control strategy, the duty cycle for switch S4 VgS4 is viewed as the main control variable, and the gating signals for other switches can be generated from VgS4. Specifically, there is 180 degrees of phase shift between switch S2 and switch S4. In addition, the gate signals for switch S1 and switch S3 are complementary with switch S2 and switch S4, respectively. According to FIG. 2, there are mainly ten operation stages during one switching cycle. Due to the symmetric characteristic of the control strategy, only half of the switching cycle operation stages (t0-t5) are described herein. The detailed analysis for each operation stage is presented as follows.

Figure 3A:
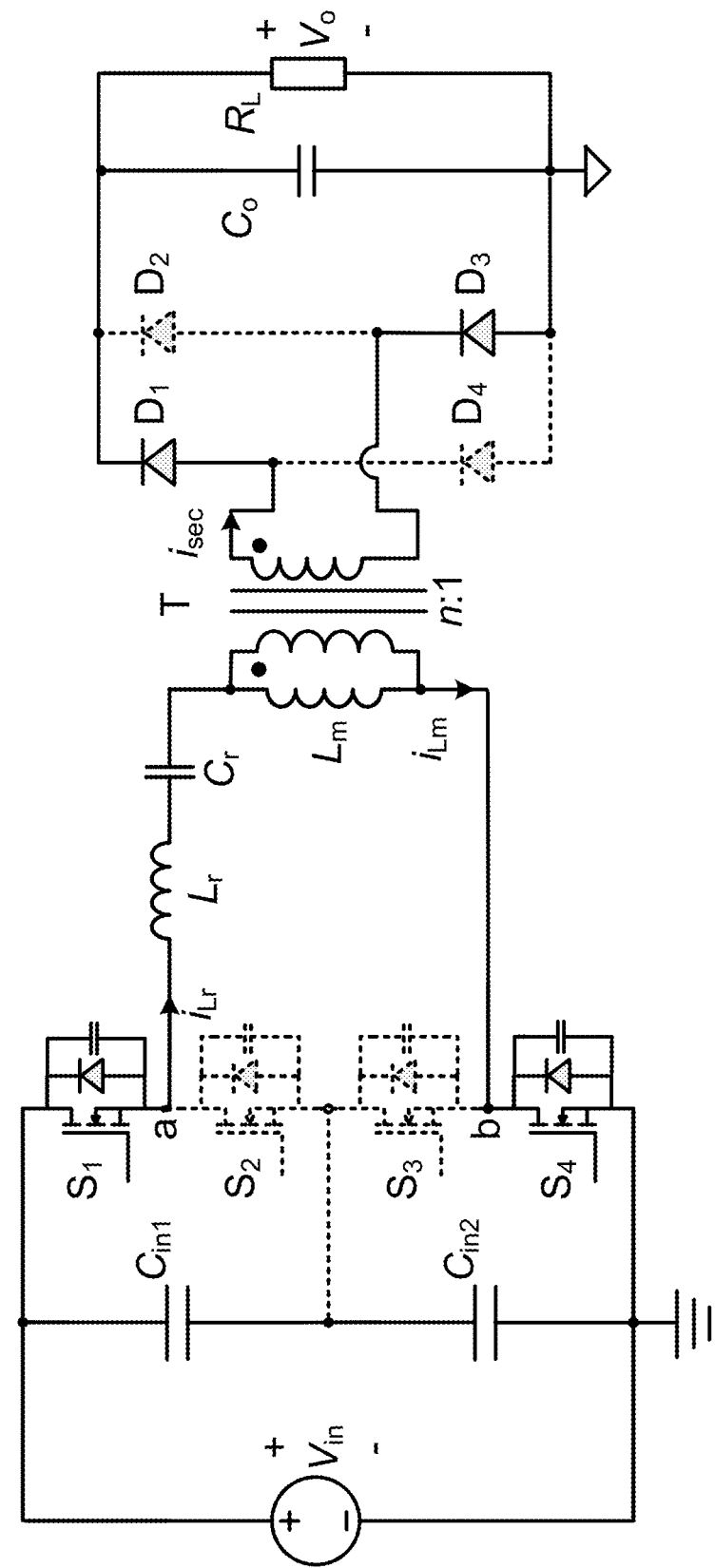
FIGS. 3A-3E show equivalent circuits of the PWM controlled stacked structure LLC resonant converter for different stages (operations) according to embodiments of the invention.

Stage 1: [t0-t1]: During stage 1, the gate signals for switch S1 and switch S4 are high, and the voltage across the magnetizing inductor $L_m$ is clamped by the positive output voltage nVo. The voltage across the resonant inductor current is positive. So, both the resonant inductor current $i_{Lr}$ and the magnetizing inductor current $i_{Lm}$ increase, and the difference between these two currents is the current flowing through the secondary side. This stage ends when the gating signal for S4 changes from high to low. The equivalent circuit in stage 1 is shown in FIG. 3A.

Figure 3B:
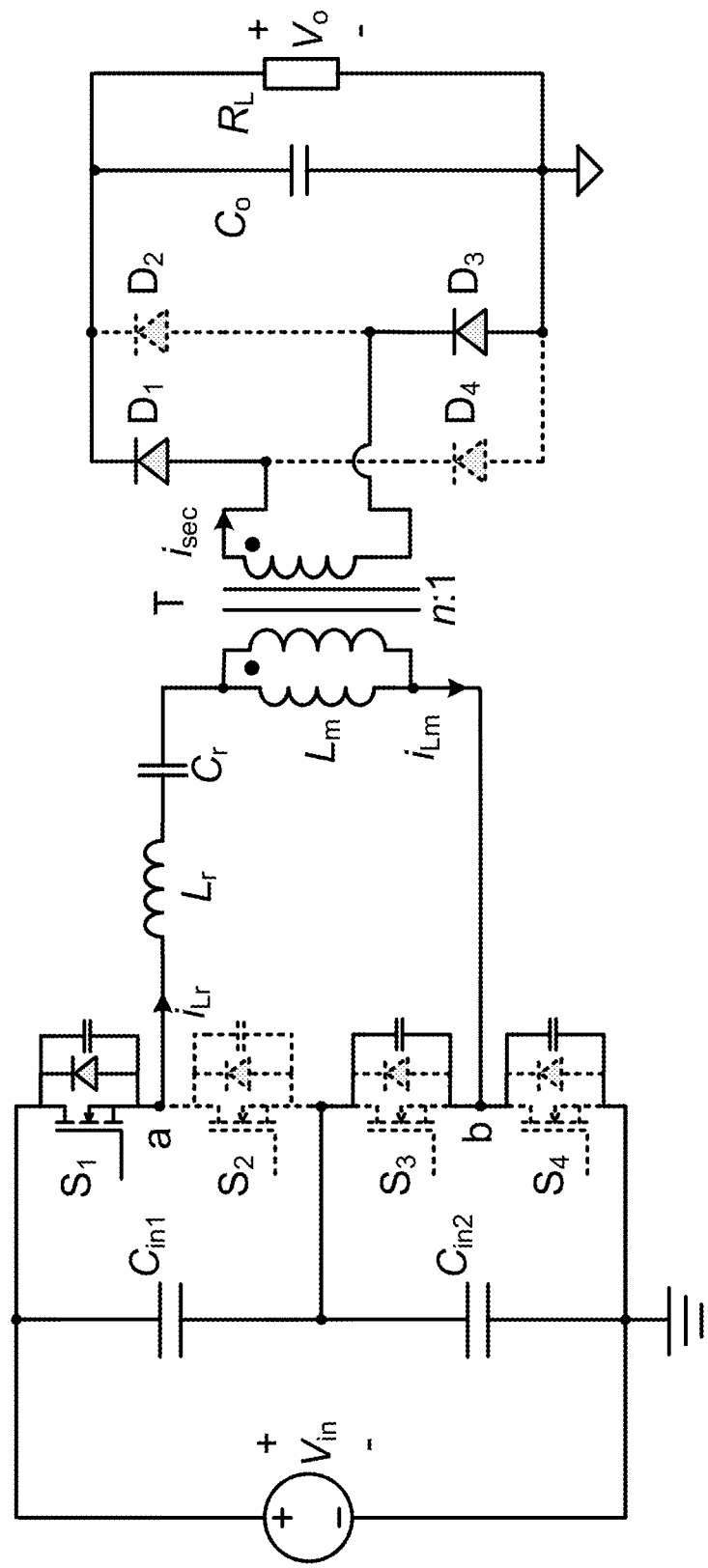

Stage 2: [t1-t2]: Due to the dead time requirement of switch S3 and switch S4, during stage 2, the resonant tank input voltage Vtank decreases from Vin to Vin/2. The resonant inductor current $i_{Lr}$ decreases. The drain-to-source capacitor of switch S3 and switch S4 are conducting to maintain the current flow during this stage. Specifically, the drain-to-source capacitor of S3 is discharging, while the drain-to-source capacitor of switch S4 is charging. If the energy stored on the capacitor of switch S3 can be discharged completely, zero-voltage turn-on for switch S3 can be achieved. The equivalent circuit is shown in FIG. 3B.

Figure 3C:
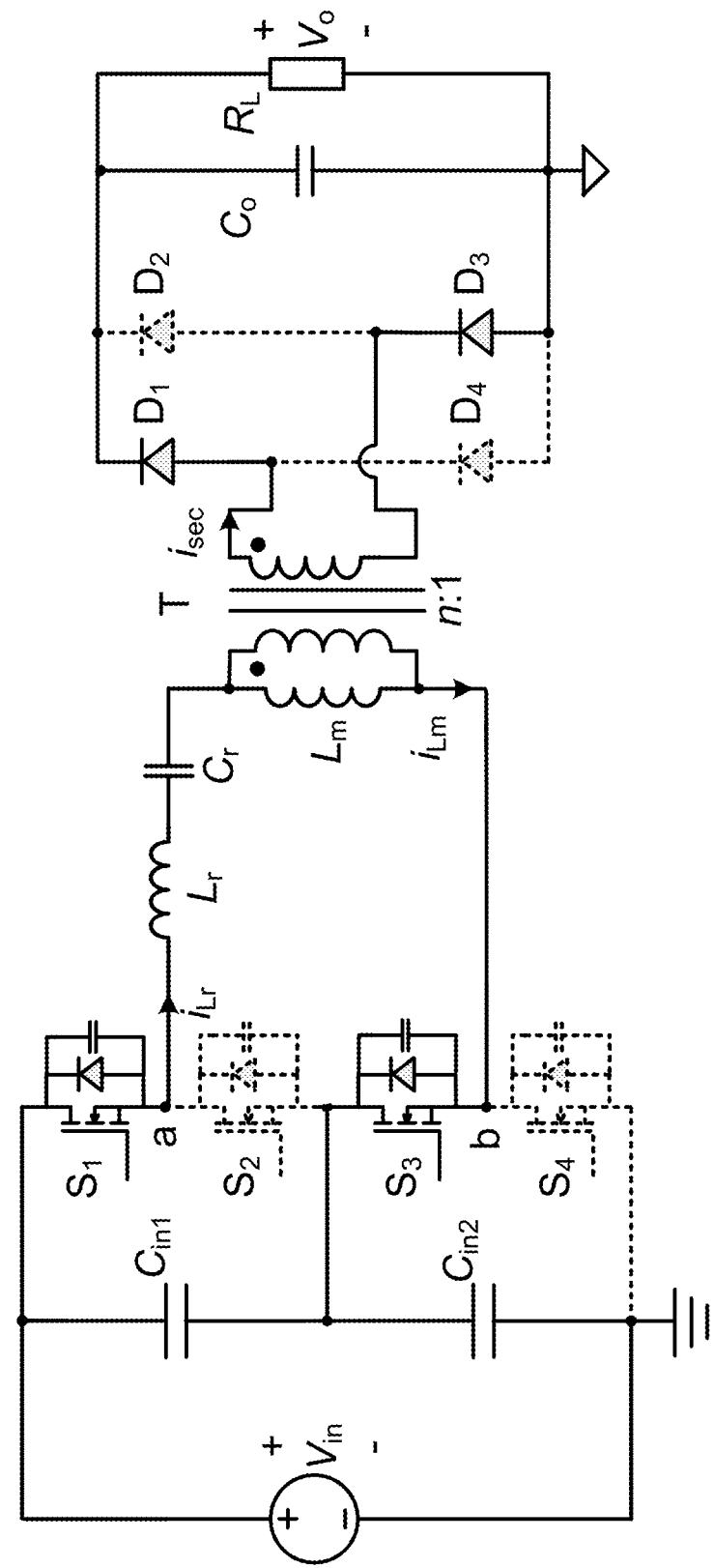

Stage 3: [t2-t3]: At time t2, switch S3 is ON, both switch S1 and switch S3 are conducting during this stage. The resonant inductor current $i_{Lr}$ keeps decreasing until the resonant inductor current $i_{Lr}$ equals the magnetizing inductor current $i_{Lm}$. The equivalent circuit is shown in FIG. 3C.

Figure 3D:
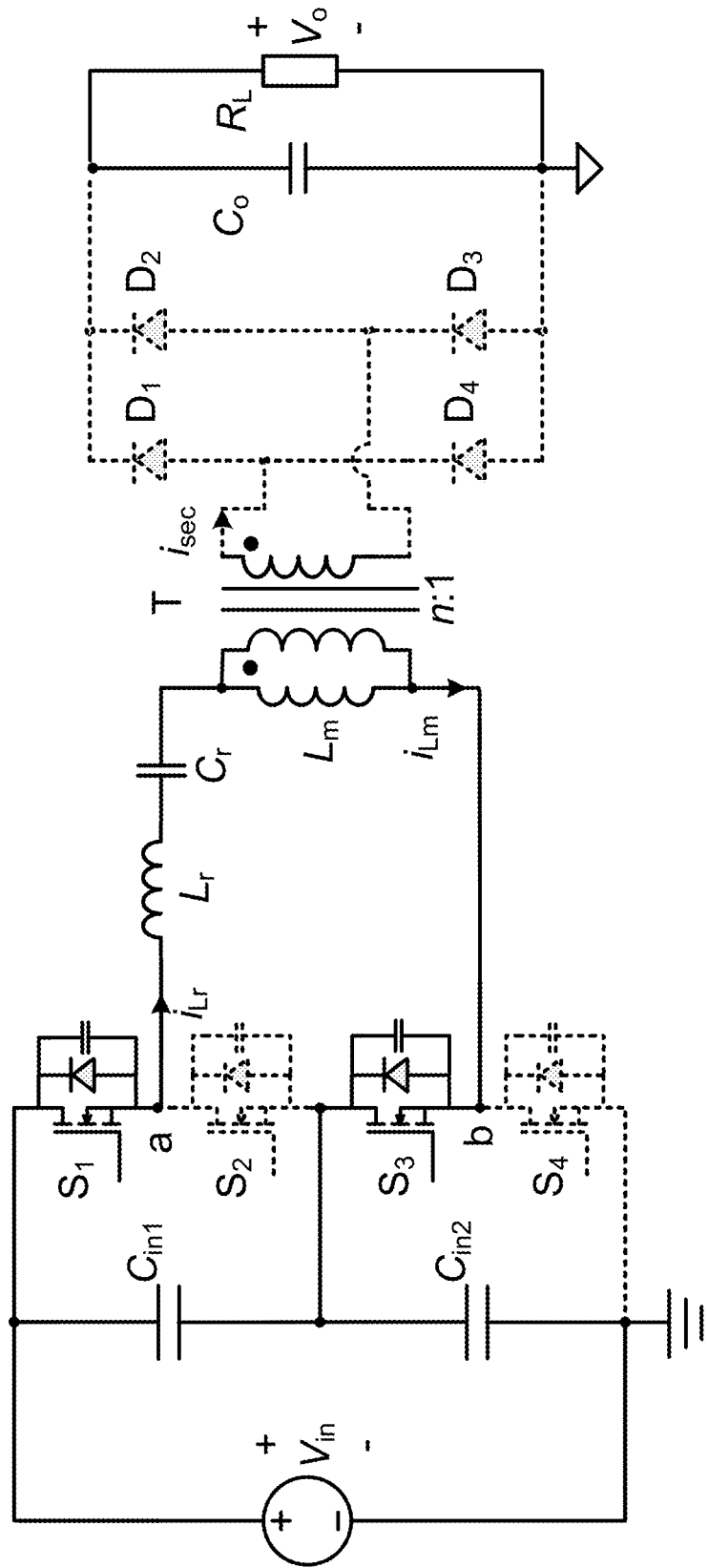

Stage 4: [t3-t4]: At time t3, the resonant inductor current $i_{Lr}$ equals the magnetizing inductor current $i_{Lm}$. The voltage across the magnetizing inductor $L_m$ is not clamped by the output voltage, and the resonant inductor $L_r$ is resonating with both the resonant capacitor $C_r$ and the magnetizing inductor $L_m$. The equivalent circuit is shown in FIG. 3D.

Figure 3E:
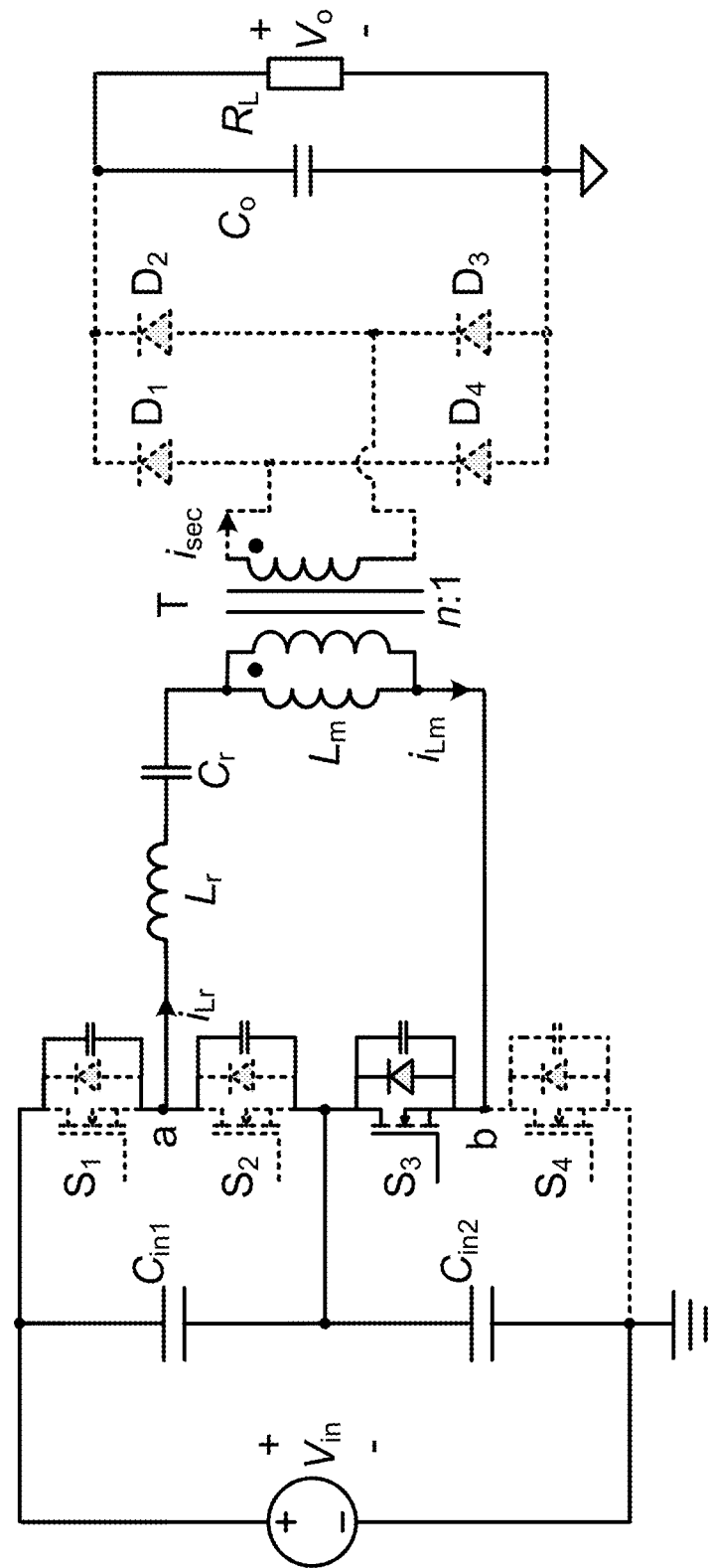

Stage 5: [t4-t5]: At time t4, switch S1 turns OFF, due to the dead time requirement of switches S1 and S2, during this stage, only switch S3 is conducting. The equivalent circuit in this stage is shown in FIG. 3E. As shown in FIG. 3A, since the resonant inductor current $i_{Lr}$ is positive during this stage, the resonant current flows through the drain-to-source capacitor of switch S2 and switch S1, where the drain-to-source capacitor of switch S1 is charging and drain-to-source capacitor of switch S2 is discharging. Similarly, zero-voltage turn-on for switch S2 can be achieved if the energy stored in the capacitor can be discharged completely before its driving signal arrives.

Figure 4:
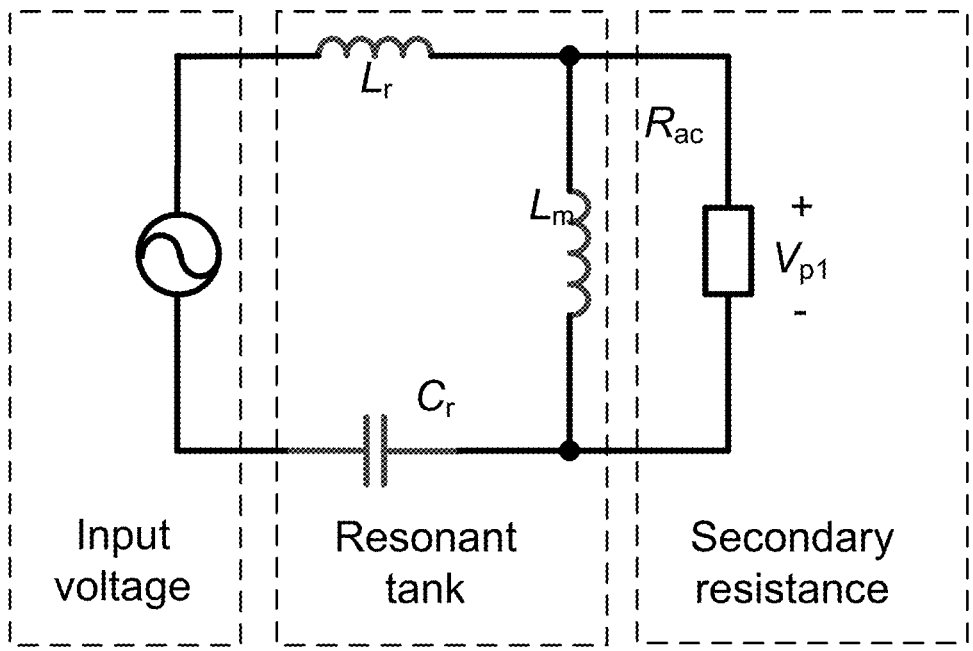
FIG. 4 shows schematically an FHA model for an LLC resonant converter according to embodiments of the invention.

Fundamental harmonic analysis (FHA) has been widely used in the analysis and design of LLC resonant converters due to its simplicity and acceptable accuracy over a wide operation range. In this disclosure, the FHA analysis method is adopted to derive the voltage gain of the the PWM controlled stacked structure LLC resonant converter. FIG. 4 shows the equivalent circuit of the LLC resonant converter using the FHA method, where Vac is the fundamental harmonic of the resonant network input voltage, Vp1 is the fundamental harmonic of the transformer primary side voltage, and Rac is the equivalent resistance of the secondary side.

Then, the voltage gain M is defined as: M=nVo/(Vin/2), which can be derived by adopting Fourier analysis.

$$M = \tfrac{1}{2}\sqrt{2 - 2\cos(2D\pi)}$$

Figure 5:
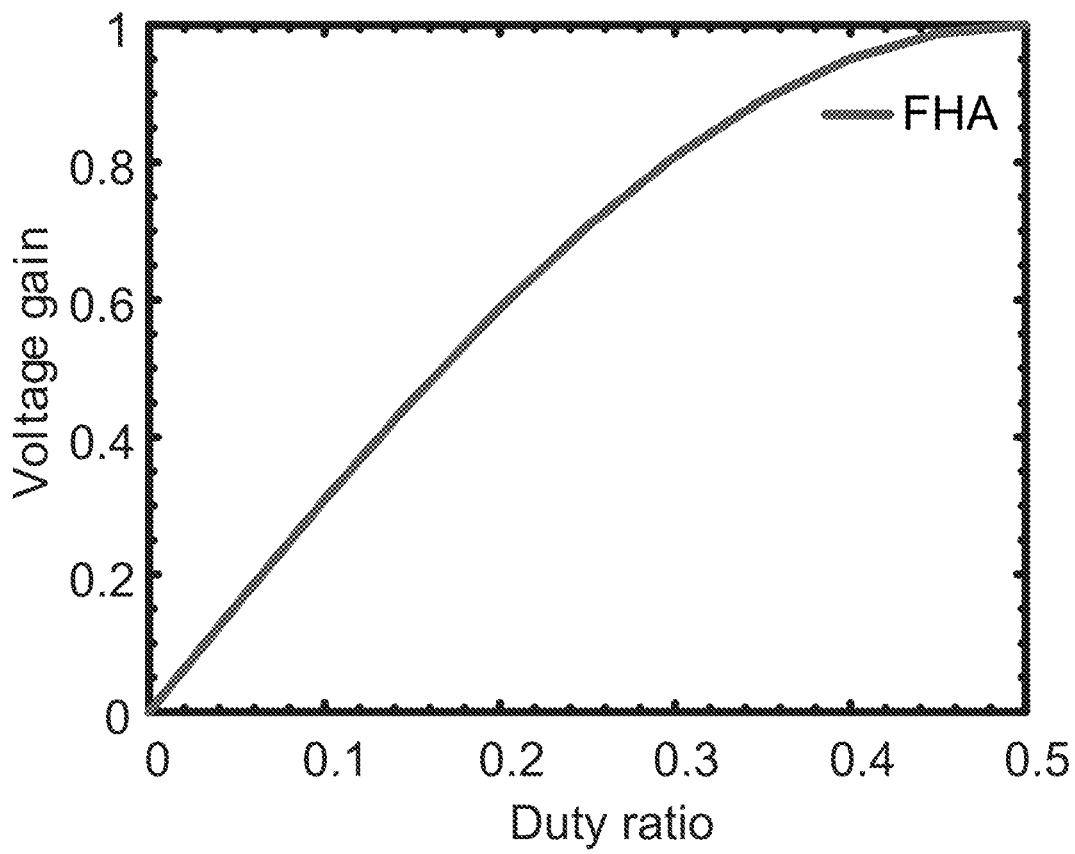
FIG. 5 shows the relationship between the duty cycle and the voltage gain according to embodiments of the invention.

FIG. 5 shows the relationship between the duty cycle and the voltage gain. It can be seen that with the increase of the duty cycle, the voltage gain increases. Specially, when the duty cycle equals 0.5, the voltage gain is unity, which is the same as the half-bridge LLC resonant converter. When the duty cycle equals 0, the voltage gain is zero.

Figure 6:
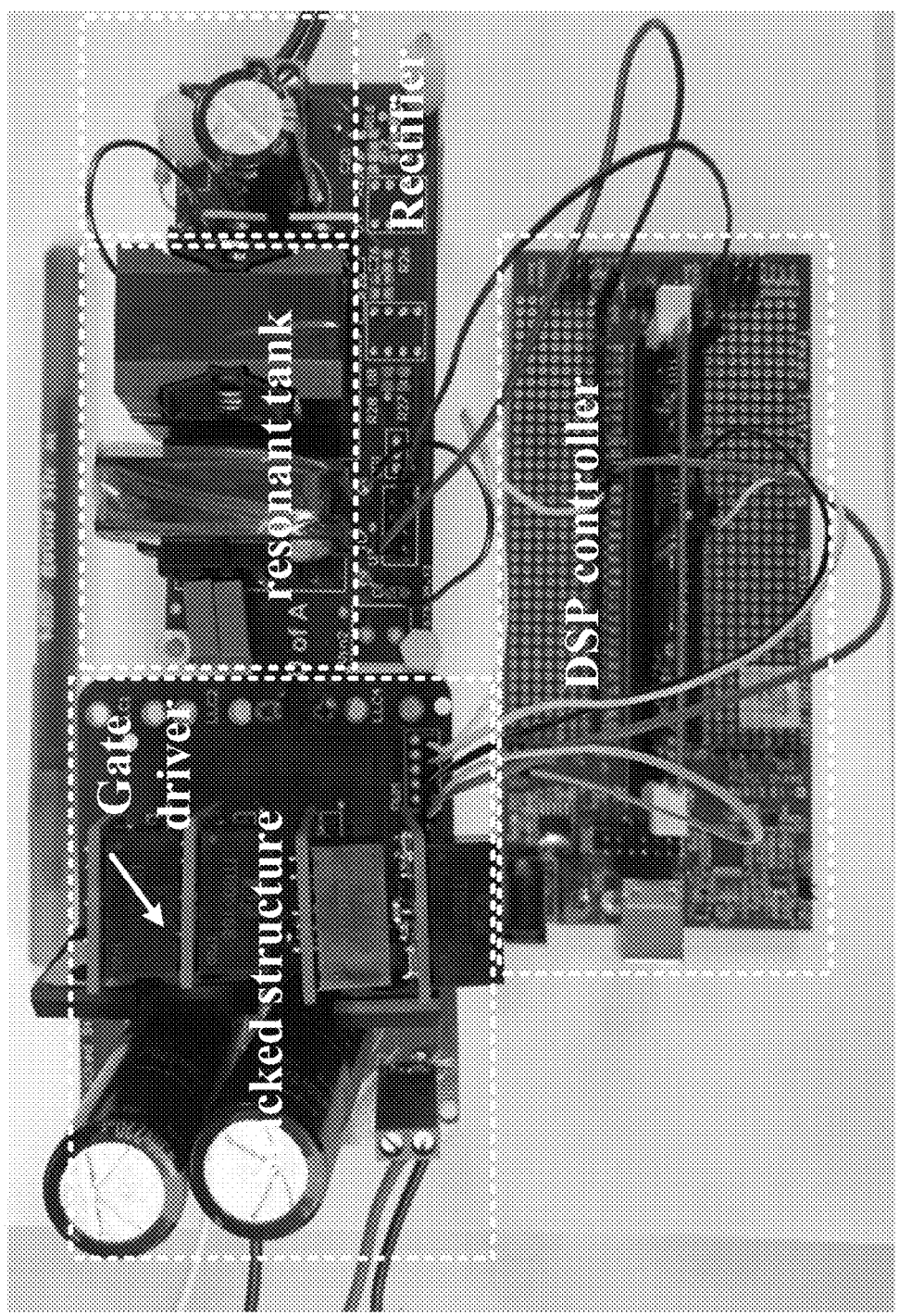
FIG. 6 shows schematically an experimental setup for PWM-controlled stacked structure LLC resonant converter according to embodiments of the invention.

To validate the PWM control strategy for stacked structure LLC resonant converter. A 100 W laboratory prototype as shown in FIG. 6 was built to verify the theoretical analysis. The digital signal processor (DSP) is used to achieve the control strategy/scheme according to embodiments of the invention.

Figure 7A:
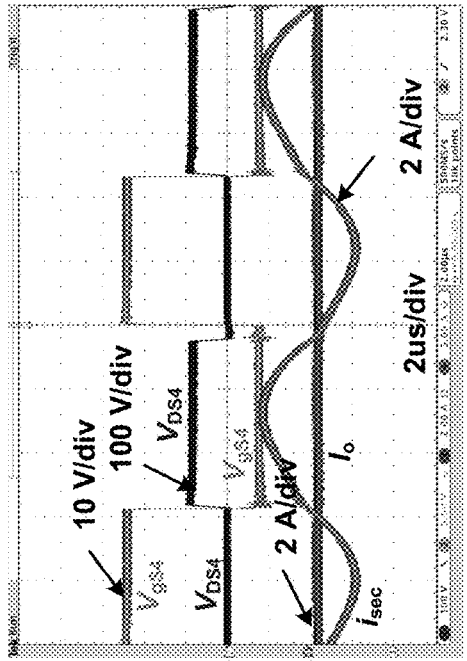
FIGS. 7A-7C shows schematically experimental waveforms when the output power Po=96 W according to embodiments of the invention.
Figure 7A:
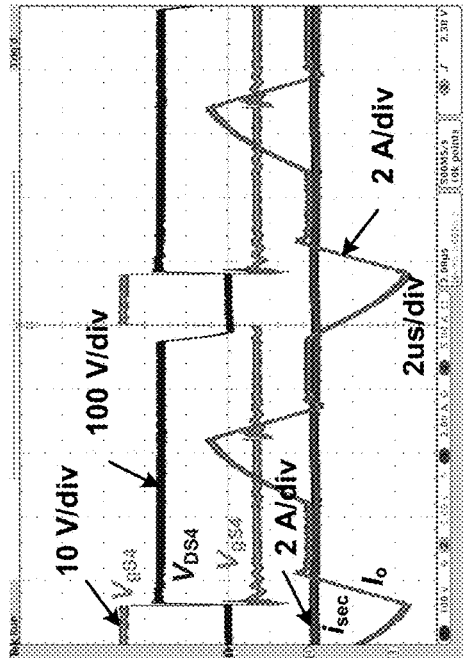
Figure 7B:
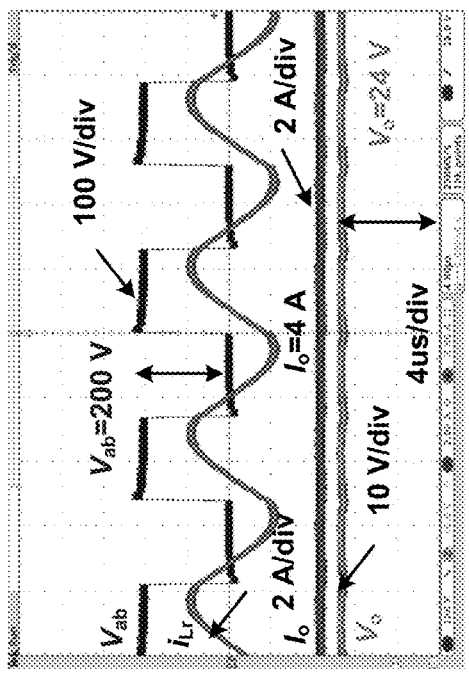
Figure 7B:
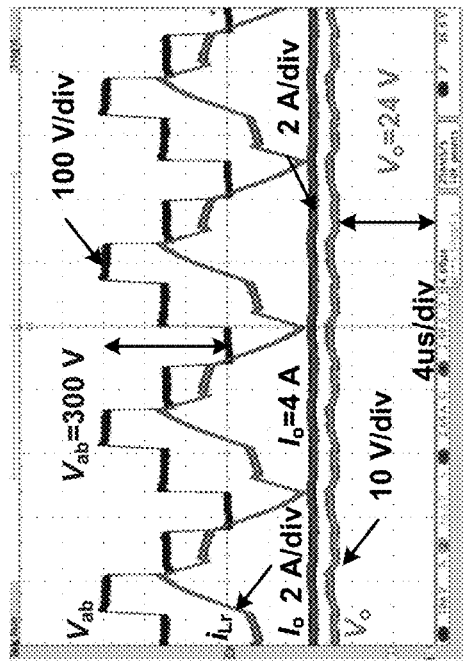
Figure 7C:
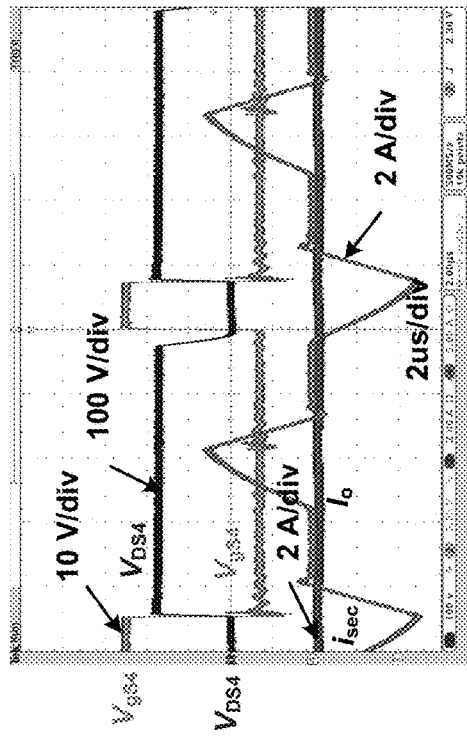
Figure 7C:
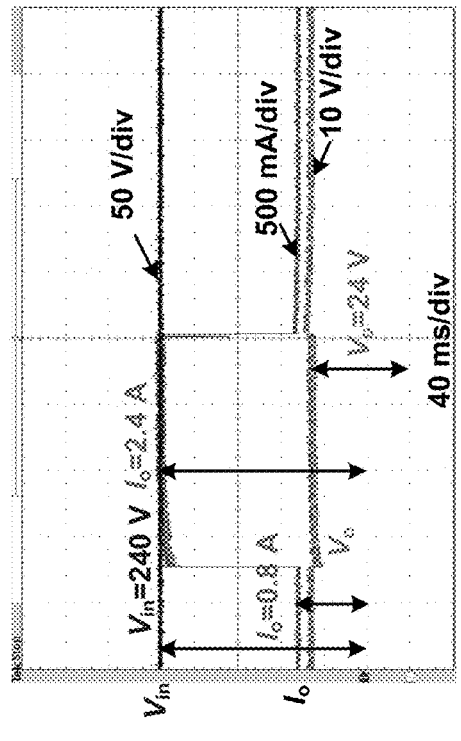

FIGS. 7A-7C show the experimental waveforms of the resonant tank input voltage $V_{ab}$, resonant inductor current $i_{Lr}$, output current $I_o$, and output voltage $V_o$ with different input voltages Vin=200, 300 and 360 V, respectively, when the output power equals 96 W. In addition, the corresponding soft switching operation waveforms are shown on the right panels, which include the drain-to-source voltage VDS4, and the gate source voltage VgS4 of switch S4, the secondary side current $i_{sec}$, and the output current $I_o$. At the minimum input voltage, the converter is operating at the series resonant frequency operating point, the resonant inductor current $i_{Lr}$ is sinusoidal, and the duty cycle reaches the maximum value. With the increase in the input voltage, the low voltage gain is required, and the duty cycle decreases to maintain the output voltage constant. From the drain-to-source and gate voltage waveforms, ZVS for switch S4 can be achieved. The voltage stress for the primary switch is half of the input voltage, which reduces the voltage stress when compared with traditional LLC resonant converters. Meanwhile, the zero current switching (ZCS) operation for the secondary rectifier is achieved.

Figure 8A:
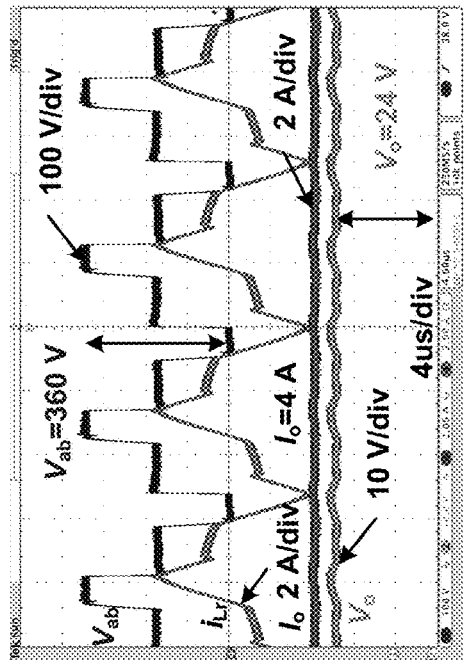
FIGS. 8A-8B shows experimental waveforms of the dynamic response according to embodiments of the invention.
Figure 8B:
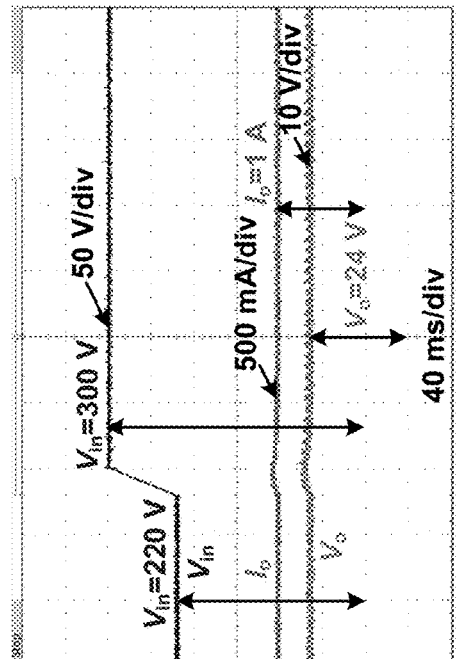

FIGS. 8A-8B show the dynamic response of the stacked structure LLC resonant converter according to embodiments of the invention, where FIG. 8A shows the abrupt change of input voltage from 220 V to 300 V when $P_o$=24 W, and FIG. 8B shows the abrupt change of the output power from 19 W to 58 W and 58 W to 19 W when $V_{in}$=240 V. It can be seen that the PWM-controlled LLC resonant converter has good dynamic performance, the voltage overshoot is small and the response time is rapid.

Wide input or output voltage range application is challenging for the conventional frequency-controlled LLC resonant converter. The PWM-controlled stacked structure LLC resonant converter according to embodiments of the invention can be applied in a wide range application with fixed switching frequency, such as automotive power electronics, renewable energy generation system, data center power supply, applications in medium and high HVDC, applications requiring high power density, and applications requiring low cost and simplicity. It can also be applied in different wide range applications, for example, electric vehicle on-board battery charger, renewable energy systems, and data center power supply, etc.

Briefly, this invention provides, among other things, a novel control strategy for the conventional stacked structure LLC resonant converter. By adopting the proposed control strategy, a three level LLC resonant network input voltage is generated, which includes Vin, Vin/2 and 0. Instead of adopting frequency control strategy, the PWM control strategy is adopted to regulate the output by controlling the duration of each voltage level. This novel control strategy benefits the LLC resonant converter in many aspects.

1) Fixed switching operation can be achieved, which is beneficial to the design and optimization of magnetic components.
2) The relationship between the voltage gain and the control variable-duty ratio is monotonous, which simplifies the design of controller and guarantees the stability of the system. 3) No modification on the conventional LLC resonant converter is required, which increases the reliability and reduces the cost of the system.
4) The voltage gain of the proposed PWM-controlled three level LLC resonant converter is not sensitive to the output load, which is suitable for wide range application.
5) The stacked structure can reduce the voltage stress for the switches, which is suitable for high input voltage application. In addition, a low voltage rating device can be selected to improve the system efficiency and reduce cost.

This invention is advantageous in high input voltage, high step-down conversion ratio, and wide input/output voltage range applications, such as a data center power supply, renewable energy systems, electric vehicle on-board battery charger and so on.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

REFERENCE LIST

[1] Guisong Huang, Alpha J. Zhang, Yilei Gu, "LLC series resonant DC-to-DC converter", U.S. Pat. No. 6,344, 979B1, 2002.
[2] W. Liu, B. Wang, W. Yao, Z. Lu and X. Xu, "Steady-state analysis of the phase shift modulated LLC resonant converter," 2016 IEEE Energy Conversion Congress and Exposition (ECCE), Milwaukee, WI, 2016, pp. 1-5.
[3] H. Wu, T. Mu, X. Gao and Y. Xing, "A Secondary-Side Phase-Shift-Controlled LLC Resonant Converter With Reduced Conduction Loss at Normal Operation for Hold-Up Time Compensation Application," IEEE Trans. Power Electron., vol. 30, no. 10, pp. 5352-5357, October 2015.
[4] Shun-Chang Lin, and Shao-Tseng Lee, "LLC resonant power converter", US20150349627A1, 2015.
[5] Yan-Fei Liu, and Yang Chen, "Resonant power converters and control methods for wide input and output voltage ranges", WO2019144241A1, 2015.
[6] Alfred Henry Barrett, "Resonant converter with controlled inductor", U.S. Pat. No. 5,684,678A, 1997.

[7] Y. Wei, Q. Luo, X. Du, N. Altin, A. Nasiri and J. M. Alonso, "A Dual Half-Bridge LLC Resonant Converter With Magnetic Control for Battery Charger Application," IEEE Trans. Power Electron., vol. 35, no. 2, pp. 2196-2207, February 2020.

[8] Y. Wei, Q. Luo, X. Du, N. Altin, J. M. Alonso and A. Mantooth, "Analysis and Design of the LLC Resonant Converter with Variable Inductor Control Based on Time Domain Analysis," IEEE Trans. Ind. Electron.

[9] X. Sun, X. Li, Y. Shen, B. Wang and X. Guo, "Dual-Bridge LLC Resonant Converter With Fixed-Frequency PWM Control for Wide Input Applications," IEEE Trans. Power Electron., vol. 32, no. 1, pp. 69-80, January 2017.

[10] H. Wang and Z. Li, "A PWM LLC Type Resonant Converter Adapted to Wide Output Range in PEV Charging Applications," IEEE Trans. Power Electron., vol. 33, no. 5, pp. 3791-3801, May. 2018.

[11] Dianbo Fu, Wensong Yu, Hengchun Mao, and Heping Dai, "Resonant Converters and Methods", US20140198536A1, 2014.

[12] Xuan-Cai Zhu, and Bing-Wen Weng, "Power converter and method for controlling the same", US20140119060A1, 2014.

What is claimed is:

1. A stacked structure LLC resonant converter, comprising:
   a stacked structure inverter electrically coupled to a power supply for generating an output voltage, wherein the stacked structure inverter comprises a first power switch, a second power switch, a third power switch and a fourth power switch electrically coupled to one another in series;
   an LLC resonant tank electrically coupled to the stacked structure inverter;
   a rectifier electrically coupled to the LLC resonant tank for providing a rectified DC voltage to an output load, wherein the rectifier comprises a voltage doubler rectifier; and
   a pulse width modulation (PWM) control scheme for regulating the output voltage from the stacked structure inverter,
   wherein the PWM control scheme comprises a control signal that is a gating signal of the fourth switch, and gating signals of the first, second and third switches that are operably generated according to the gating signal of the fourth switch;
   wherein the gating signals of the second and fourth switches have a same duty ratio and a phase shift of 180 degrees; and
   wherein the gate signals of the first and third switches are complementary with the gate signals of the second and fourth switches, respectively.

2. The stacked structure LLC resonant converter of claim 1, wherein the stacked structure inverter further comprises:
   a first input terminal and a second input terminal electrically coupled to the power supply for receiving an input voltage therefrom;
   a first output terminal and a second output terminal for outputting the output voltage; and
   a first input capacitor and a second input capacitor electrically coupled between the first input terminal and the second input terminal, respectively, wherein the first input capacitor and the second input capacitor are electrically coupled to one another in series;
   wherein the first power switch is electrically coupled between the first input terminal and the first output terminal; the second power switch is electrically coupled between the first output terminal and a middle node between the first input capacitor and the second input capacitor; the third power switch is electrically coupled between the middle node and the second output terminal; and the fourth power switch is electrically coupled between the second input terminal and the second output terminal.

3. The stacked structure LLC resonant converter of claim 2, wherein each of the first, second, third and fourth switches is a half bridge switch.

4. The stacked structure LLC resonant converter of claim 2, wherein the LLC resonant tank comprises
   a transformer comprising a primary winding and a secondary winding; and
   an LLC resonant circuit electrically coupled between the first and second output terminals of the stacked structure inverter, and comprising a first inductor, a resonant capacitor and a second inductor electrically connected to one another in series, wherein the second inductor is electrically connected to the primary winding of the transformer in parallel.

5. The stacked structure LLC resonant converter of claim 4, wherein the second inductor is a magnetizing inductor.

6. The stacked structure LLC resonant converter of claim 4, wherein the rectifier is electrically coupled to the secondary winding of the transformer.

7. The stacked structure LLC resonant converter of claim 1, wherein the rectifier further comprises a filtering capacitor for filtering the rectified DC voltage outputted to the output load.

8. A control method for the stacked structure LLC resonant converter of claim 2, comprising:
   providing the control signal as the gating signal of the fourth switch; and generating the gating signals of the first, second and third switches according to the control signal; and
   applying the control signal to the fourth switch and the generated gating signals to the first, second and third switches, respectively, so as to generate the output voltage,
   wherein the generated gating signals of the second switch has a same duty ratio as and a phase shift of 180 degrees from the gating signal of the fourth switch; and wherein the generated gate signals of the first and third switches are complementary with the gate signals of the second and fourth switches, respectively.

9. The control method of claim 8, wherein the inverter output voltage is regulated to have three levels, Vin, Vin/2 and 0, wherein Vin is the input voltage from the power supply, thereby generating a three level LLC resonant input voltage for the LLC resonant tank.

10. The control method of claim 8, wherein the output voltages are controllable with the duration of each voltage level of the control signal.

11. The control method of claim 8, wherein a voltage gain of the stacked structure LLC resonant converter has a monotonic relationship with a duty ratio of the control signal, and is not sensitive the output load.

12. The stacked structure LLC resonant converter of claim 1, wherein the output voltage from the stacked structure inverter is regulated to have three levels, Vin, Vin/2 and 0, wherein Vin is the input voltage from the power supply, thereby generating a three level LLC resonant input voltage for the LLC resonant tank.

13. The stacked structure LLC resonant converter of claim 1, wherein the output voltages are controllable with a duration of each voltage level of the control signal of the gating signal of the fourth switch.

14. The stacked structure LLC resonant converter of claim 1, wherein a voltage gain of the stacked structure LLC resonant converter has a monotonic relationship with a duty ratio of the control signal.

15. The stacked structure LLC resonant converter of claim 14, wherein the voltage gain is not sensitive of the output load.

* * * * *